United States Patent
Sodagar

(10) Patent No.: US 12,437,617 B2
(45) Date of Patent: Oct. 7, 2025

(54) METHOD AND APPARATUS FOR FRAME-ACCURATE HAPTICS INTERCHANGE FILE FORMAT

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 105 days.

(21) Appl. No.: 18/405,941

(22) Filed: Jan. 5, 2024

(65) Prior Publication Data
US 2024/0233498 A1    Jul. 11, 2024

Related U.S. Application Data

(60) Provisional application No. 63/437,615, filed on Jan. 6, 2023.

(51) Int. Cl.
*G08B 6/00* (2006.01)
*H04L 67/02* (2022.01)

(52) U.S. Cl.
CPC ............... *G08B 6/00* (2013.01); *H04L 67/02* (2013.01)

(58) Field of Classification Search
USPC ........ 340/407.1, 815.4, 815.43, 815.46, 321, 340/327, 328, 329, 330, 331, 333
See application file for complete search history.

(56) References Cited

U.S. PATENT DOCUMENTS

| | | | |
|---|---|---|---|
| 2009/0128306 A1 | 5/2009 | Luden et al. | |
| 2015/0049163 A1* | 2/2015 | Smurro | H04L 65/403 348/14.08 |
| 2015/0154966 A1* | 6/2015 | Bharitkar | G10L 19/008 381/23 |
| 2019/0098368 A1* | 3/2019 | Phan | A63F 13/25 |
| 2024/0127680 A1* | 4/2024 | Sodagar | G08B 6/00 |
| 2024/0129578 A1* | 4/2024 | Sodagar | H04N 21/816 |

OTHER PUBLICATIONS

ISO/IEC JTC 1/SC 29/WG 7 N449, MPEG 3 D Graphics and Haptics Coding Convenorship: AFNOR (France), "Text for Committee Draft of ISO/IEC 23090-31: Haptics Coding", Oct. 27, 2022, pp. 1-118.
Written Opinion of the International Searching Authority dated May 8, 2024 in Application No. PCT/US24/10661.
International Search Report dated May 8, 2024 in Application No. PCT/US24/10661.

* cited by examiner

*Primary Examiner* — Daniel Previl
(74) *Attorney, Agent, or Firm* — Sughrue Mion, PLLC

(57) ABSTRACT

A method of signaling a haptic java script object notation (JSON) interchange file format (HJIF) file comprises processing the HJIF file into a binary file format for distribution in a bitstream, in which the HJIF file comprises a plurality of haptic channels, in which each haptic channel from the plurality of haptic channels is defined by a channel description that comprises a relative position parameter that specifies a relative position of a keyframe included in the data and a haptic position parameter of a haptic effect, in which the relative position parameter and the haptic position parameter are specified in accordance with a scale, and in which the haptic effect and keyframe of each channel are synchronized with video or audio included in the bitstream based on the scale.

20 Claims, 6 Drawing Sheets

METHOD AND APPARATUS FOR FRAME-ACCURATE HAPTICS INTERCHANGE FILE FORMAT

CROSS-REFERENCE TO RELATED APPLICATION

This application claims priority from U.S. Provisional Application No. 63/437,615 filed on Jan. 6, 2023, the disclosure of which is incorporated herein by reference in their entirety.

FIELD

The disclosure generally relates to providing a frame-accurate haptics interchange file format.

BACKGROUND

The use of haptics has become a part of multimedia presentation. In such an application, haptic signals are delivered to a device or wearable hardware, where the user feels the haptic sensations during the use of the application. Recently, MPEG has started working on a compression standard for haptics.

The haptic Committee Draft includes one java script object notation (JSON) format and two binary formats. The MIHS binary format provides the possibility of video/audio frame-accurate synchronization of the haptic experience. However, the haptic JSON interchange file (HJIF) format does not support such signaling.

SUMMARY

According to one or more embodiments, a method of signaling a haptic java script object notation (JSON) interchange file format (HJIF) file comprises processing the HJIF file into a binary file format for distribution in a bitstream, wherein the HJIF file comprises a plurality of haptic channels, wherein each haptic channel from the plurality of haptic channels includes a channel description that comprises a relative position parameter that specifies a relative position of a keyframe included in the data and a haptic position parameter of a haptic effect, wherein the relative position parameter and the haptic position parameter are specified in accordance with a scale, and wherein the haptic effect and keyframe of each channel are synchronized with video or audio included in the bitstream based on the scale.

According to one or more embodiments, an apparatus for signaling a haptic java script object notation (JSON) interchange file format (HJIF) file, the apparatus comprising: at least one memory configured to store program code; and at least one processor configured to read the program code and operate as instructed by the program code, the program code including processing code configured to cause the at least one processor to process the HJIF file into a binary file format for distribution in a bitstream, wherein the HJIF file comprises a plurality of haptic channels, wherein each haptic channel from the plurality of haptic channels includes a channel description that comprises a relative position parameter that specifies a relative position of a keyframe included in the data and a haptic position parameter of a haptic effect, wherein the relative position parameter and the haptic position parameter are specified in accordance with a scale, and wherein the haptic effect and keyframe of each channel are synchronized with video or audio included in the bitstream based on the scale.

According to one or more embodiments, an apparatus for signaling a haptic java script object notation (JSON) interchange file format (HJIF) file, the apparatus comprising: at least one memory configured to store program code; and at least one processor configured to read the program code and operate as instructed by the program code, the program code including processing code configured to cause the at least one processor to process the HJIF file into a binary file format for distribution in a bitstream, wherein the HJIF file comprises a plurality of haptic channels, wherein each haptic channel from the plurality of haptic channels is defined by a channel description that comprises a relative position parameter that specifies a relative position of a keyframe included in the data and a haptic position parameter of a haptic effect, wherein the relative position parameter and the haptic position parameter are specified in accordance with a scale, and wherein the haptic effect and keyframe of each channel are synchronized with video or audio included in the bitstream based on the scale.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
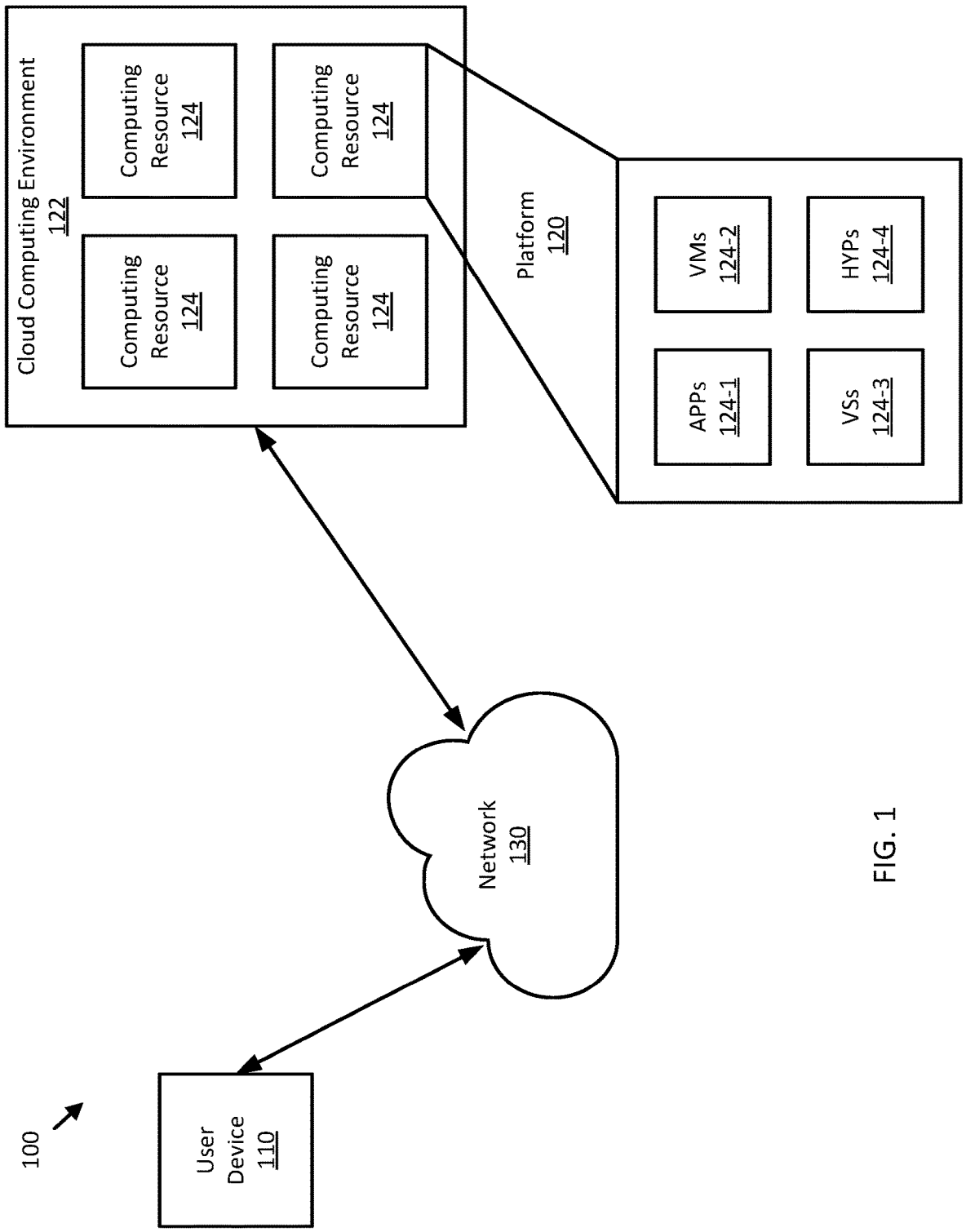
FIG. 1 is a diagram of an environment in which methods, apparatuses, and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSS) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
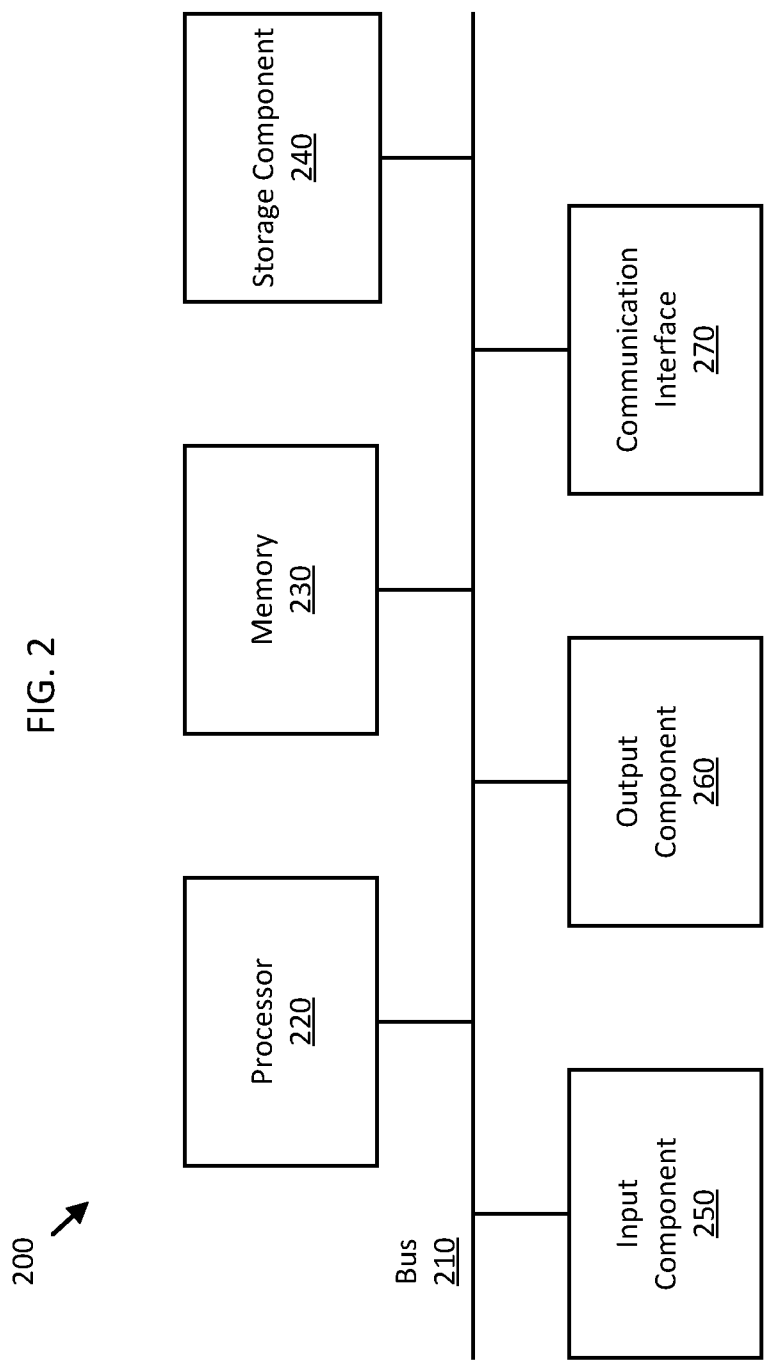
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
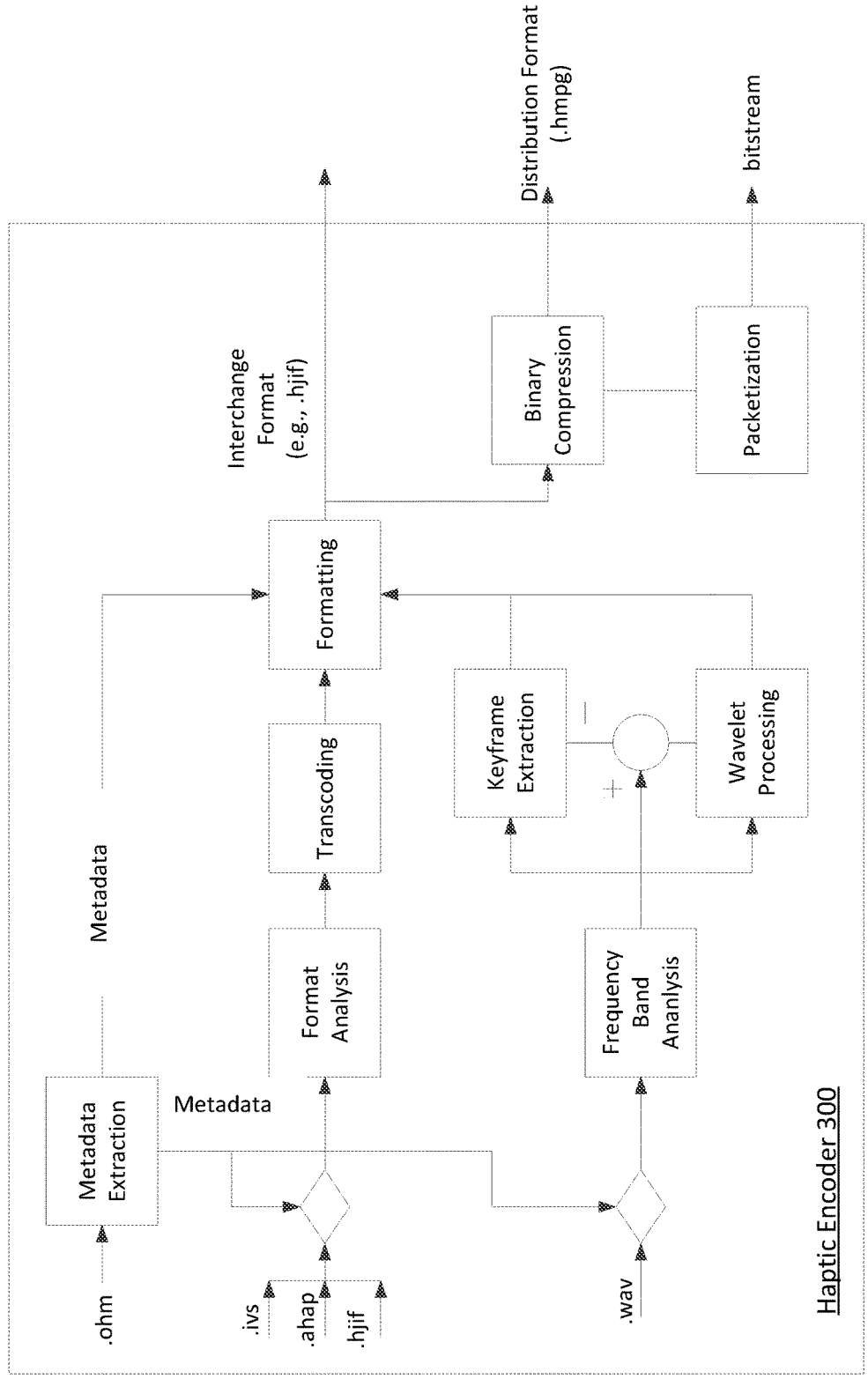
FIGS. 3 and 4 are an illustration of a haptic codec architecture, according to embodiments.
Figure 4:
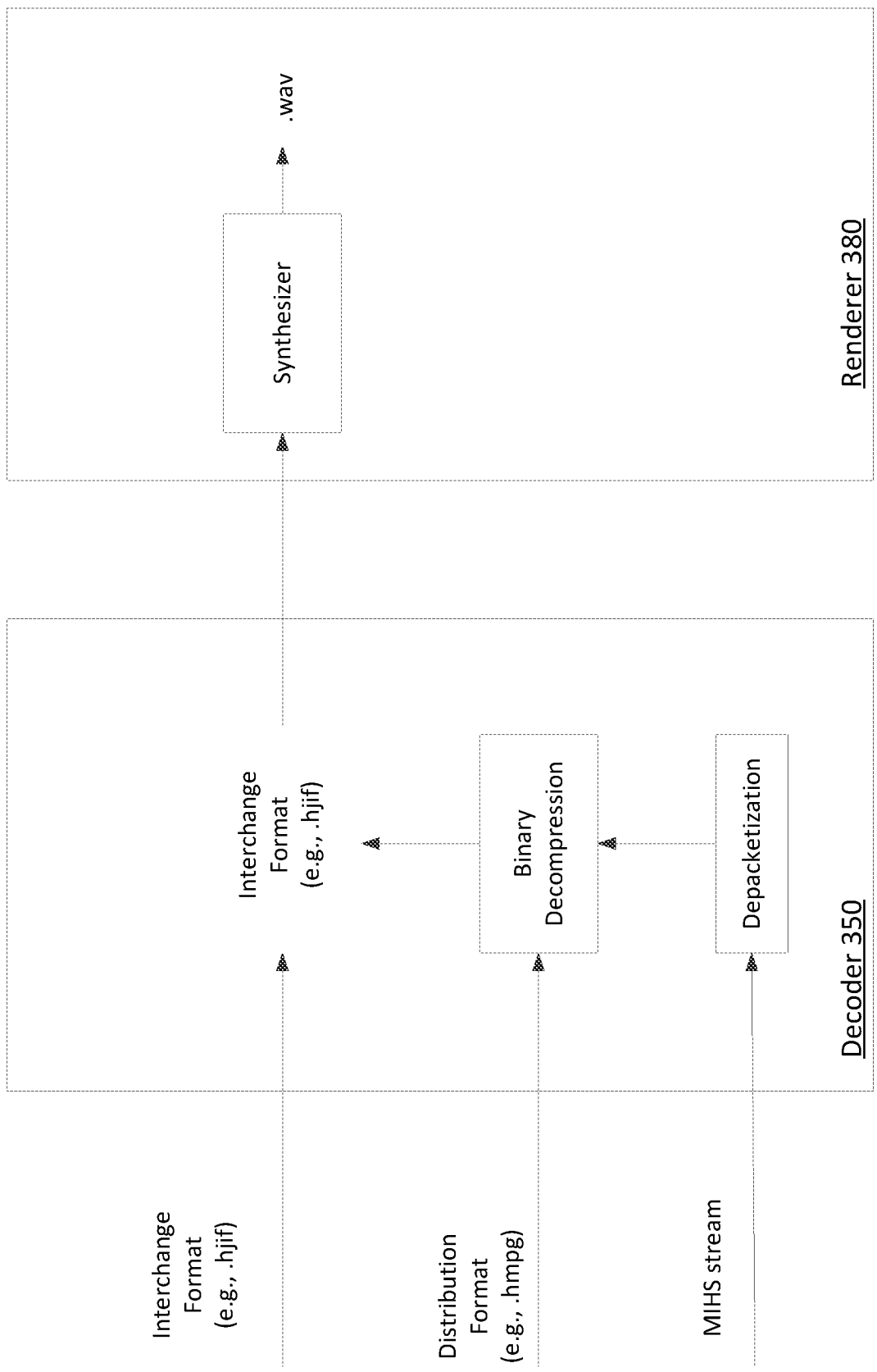

With reference to FIGS. 3-4, an embodiment of the present disclosure for implementing haptic encoder 300 and haptic decoder 350 are described.

As shown in FIG. 3, the haptic encoder 300 may receive both descriptive and waveform haptic data. Thus, the haptic encoder 300 may be able to process three types of input files: .ohm metadata files (Object Haptic Metadata—Text file format for haptics metadata), descriptive haptics files (.ivs, .ahap, and .HJIF) or waveform PCM files (.wav). An example of descriptive data may include .ahap (Apple Haptic and Audio Pattern—JSON-like file format that specifies a haptic pattern) from Apple (representing the expected haptic output by a set of modulated continuous signals and a set of modulated transients parametrized), .ivs from Immersion (representing the expected haptic output by a set of basis effects parametrized by a set of parameters), or .hjif (Haptics JSON Interchange Format) the proposed MPEG format. An example of the waveform pulse-code modulation (PCM) signals may include .ohm input files that include metadata information.

According to an embodiment, the haptic encoder 300 may process the two types of input files differently. For descriptive content, the haptic encoder 300 may analyze the input semantically to transcode (if necessary) the data into the proposed coded representation.

According to an embodiment, the .ohm metadata input file may include a description of the haptic system and setup. In particular, it may include the name of each associated haptic file (either descriptive or PCM) along with a description of the signals. It also provides a mapping between each channel of the signals and the targeted body parts on the user's body. For the .ohm metadata input file, the haptic encoder performs metadata extraction by retrieving the associated haptic files from the URI and encodes it based on its type and by extracting the metadata from the .ohm file and maps it to metadata information of the data model.

According to an embodiment, descriptive haptics files (e.g., .ivs, .ahap, and .hjif) may be encoded through a simple process. The haptic encoder 300 first identifies specifically the input format. If the input format is a .hjif file, then no transcoding is necessary, the file can be further edited, compressed into the binary format and eventually packetized into an MIHS stream. If .ahap or .ivs input files are used, a transcoding is necessary. The haptic encoder 300 first analyses the input file information semantically and transcodes it to be formatted into a selected data model. After transcoding, the data can be exported as the .hjif file, a .hmpg binary file or an MIHS stream.

According to an embodiment, the haptic encoder 300 may perform signal analysis to interpret the signal structure of the .wav files and convert it into the proposed encoded representation. For waveform PCM content, the signal analysis process may be split into two sub-processes by the haptic encoder 300. After performing a frequency band decomposition on the signal, at a first sub-process, low frequencies may be encoded using a keyframe extraction process. The low frequency band(s) may then be reconstructed and the error between this signal and the original low frequency signal may be computed. This residual signal may then be added to the original high frequency band(s), before encoding using Wavelet Transforms, the encoding using Wavelet Transforms being the second sub-process. According to an embodiment, when several low frequency bands are used, the residual errors from all the low frequency bands are added to the high frequency band before encoding. In embodiment when several high frequency bands are used, the residual errors from the low frequency band(s) are added to the first high frequency band before encoding.

According to an embodiment, keyframe extraction includes taking the lower frequency band from the frequency band decomposition and analysing its content in the time domain. According to an embodiment, wavelet processing may include taking the high frequency band from the frequency band decomposition and the low frequency residual, and splitting it into blocks of equal size. These signal blocks of equal size are then analysed in a psychohaptic model. The lossy compression may be applied by wavelet transforming the block and quantizing it, aided by the psychohaptic model. In the end, each block is then saved into a separate effect in a single band, which is done in the formatting. The binary compression may apply lossless compression using the appropriate coding techniques, e.g., the Set partitioning in hierarchical trees (SPIHT) algorithm and Arithmetic Coding (AC).

As shown in FIG. 3, the haptic encoder 300 may be configured to encode descriptive and quantized haptic data and may output three types of formats—an interchange format (.hjif), a binary compressed format (.hmpg), and a streaming format (e.g., MPEG immersive haptic stream (MIHS)). The .hjif format is a human-readable format based on JSON and can easily be parsed and manually edited which makes it an ideal interchange format, especially when designing/creating content. For distribution purposes, the .hjif data can be compressed into a more memory efficient binary .hmpg bitstream. This compression may be lossy, with different parameters impacting the encoding depth of amplitude and frequencies composing the bitstream. For streaming purposes, the data can be compressed and packetized into a MPEG-I haptic stream (MIHS). The above-mentioned three formats have complementary purposes and a lossy one-to-one conversion may be operated between them.

As shown in FIG. 4, the haptic decoder 350 may take as input either a .hmpg compressed binary file format or an MIHS bitstream. the haptic decoder 350 may output a .hjif interchange format that can be used directly for rendering. The two input formats may go through a binary decompression to extract both the metadata and the data itself from the file and map it to the selected data structure. Then, the data can be exported in the .hjif format to the haptic renderer 380.

As shown in FIG. 4, the renderer 380 comprises a synthesizer. The synthesizer may render haptic data from a HJIF input file into a PCM output file. The rendering and/or synthesizing is informative. According to an embodiment, the synthesizer parses the input files and performs the high-level synthesis distribution between vectorial, wavelets, etc. The synthesis process then goes down to the Band component of the codec in which a synthesis process is called. Then all the bands of a given channel are mixed by a simple addition operator to recreate the desired haptic signal.

Embodiments of the present disclosure are directed to adding a scale to each channel description in HJIF. The scale may be used for both temporal as well as spatial positions and offsets. A haptic channel may correspond to haptic sensations provider to different parts of a person's body wearing one or more devices. For example, a person wearing a first device on a head, a second device on a right hand, and a third device on a left hand may be associated with a first haptic channel, a second haptic channel, and a third haptic channel, respectively. A haptic channel may include one or more of the following properties in a haptic channel description in a HJIF file.

In one or more examples, a HJIF file may include an "ID" field corresponding to a unique identifier of a haptic channel.

In one or more examples, a HJIF file may include a "description" field corresponding to a description of a channel. For example, the description may specify a type of device associated with the channel and a description of haptic data associated with a haptic experience.

In one or more examples, a HJIF file may include a "reference device id" corresponding to a targeted reference device form a list defined in a perception field.

In one or more examples, a HJIF file may include a "Gain" field corresponding to a gain associated with a channel to adapt the normalized encoded data values to a typical device. The gain may be determined as follows:

$$V = \text{gain} * x, \quad \text{Eq. (1)}$$

where x corresponds to normalized encoded data.

In one or more examples, a HJIF file may include a "mixing weight" field corresponding to a weight of a channel when mixing different channels together to produce a mixed signal. The resulting signal may be determined as follows:

$$V = \frac{\sum V_i * \text{weight}_i}{\sum \text{weight}_i}, \quad \text{Eq. (2)}$$

where Vi corresponds to the signal of channel i. A mixing weight of 0 may indicate that the channel is not mixed.

In one or more examples, a HJIF file may include a "body part mask" field corresponding Binary mask specifying the location of the effect on the body. A binary mask 0x0 may indicate that a body part is not specified. An application may render an effect anywhere. A mask 0xFFFFFFFF may correspond to a full body of a person (e.g., the haptic effect is applied on the whole body). For examples, this mask may be used for background effects such as the impact of an explosion.

In one or more examples, a HJIF file may include an "actuator resolution" field corresponding to a reference actuator resolution used to design a haptic experience. This value may be linked to a body part target and actuator target and may be used together as an experience spatialization model on the human body.

In one or more examples, a HJIF file may include a "body part target" field corresponding to identification of a unique and/or a group of body parts on the human body semantically. This field includes values which can be stored here to construct the targeting command.

In one or more examples, a HJIF file may include a "frequency sampling" field that includes a sampling frequency of the original encoded signal (Hz). This field may be used by a synthesizer to reconstruct the original signal. However, the synthesizer may sample the output signal at another sampling frequency.

In one or more examples, a HJIF file may include a "Scale" field that includes a number of ticks. This value may be used as the scale for a haptic effect and a keyframe position in this channel. The position may be a spatial position (e.g., unit of distance) or a spatial position (e.g., unit of time). For example, the number of ticks may be per second or per meter.

Each tick may be represented by a different integer value k, where k=0, 1, 2, . . . N. For example, the scale may be a unit of time, where each tick is correlated with a second, or a unit of distance, where each tick is correlated with a meter. For example, when k=2, according to the scale, the tick with a value of 2 may be correlated with 2 seconds or 2 meters. In another example, according to the scale, the tick may be divided by a value M, where actual second or meter of a haptic effect or keyframe relative position is determined as k/M. In another example, according to the scale, the tick may be multiplied by a value M, where the actual second or meter of a haptic effect or keyframe relative position is determined as k*M.

In one or more examples, a HJIF file may include a "sample count" field that may be present if the frequency sampling value is greater than 0. This field may include the number of samples of the original encoded signal. This field may be used along with the frequency sampling by the synthesizer to ensure that the output signal has the same size and duration as the original file.

In one or more examples, a HJIF file may include a "vertices" field. This field may include a list of the vertices from an avatar impacted by the effect. For example, this field may include a list of indices of the vertices from the mesh associated to the avatar of the perception. If the avatar does not specify a mesh, this field may be ignored. The vertices impacted by the effects of this channel are the body locations where the effects should be applied. The appropriate avatar representation may be referenced by the avatar id indicated at the perception level.

In one or more examples, a HJIF file includes a "bands" field. This field may include a list of haptic bands composing the channel. A channel can include one or several bands. A band corresponds to a frequency bandwidth. If the bands array is empty, the bands array corresponds to a channel without any haptic effect. The haptic signal of a channel may be a sum of the signals in each band.

In one or more examples, a HJIF file includes a "direction" field. This field may specify a spatial direction for a channel. In one or more examples, this direction metadata may only be used with haptic modalities dependent on the space dimension (e.g., Vibrotactile Texture, Stiffness, and Friction). This may indicate a preferred rendering direction of a haptic perception of a targeted body part. This may be composed with X, Y and Z following the formalism for unit vectors to indicate any direction in the 3D space. Each integer value stored in this vector may be transformed from its initial range [−127; 127] to the [−1; 1] range to interpret this vector as unitary.

Table 1 illustrates an example description of MPEH_haptics.effect object that defines a haptic effect position based in the scale.

TABLE 1

| Property | Type | Default | Description | Required |
| --- | --- | --- | --- | --- |
| Id | Integer | N/A | Unique identifier of an effect. This attribute is | No |

TABLE 1-continued

| Property | Type | Default | Description | Required |
|---|---|---|---|---|
| | | | only required for library effects and "Reference" effects. For "Reference" effects, it corresponds to the id of the library effect being referenced. The value must be greater or equal to 0. | |
| effect_type | enum<string> | Basis | Indicates the type of haptic effect. Effect-type value equals one of: "Basis", "Composite" and "Reference". | Yes |
| position | Integer | 0 | Indicates the temporal or spatial position of the effect in scale. For example, the value position/scale may indicate a temporal/spatial position in seconds/meters. The value is greater than or equal 0. | Yes |
| phase | Number | 0 | Phase of the effect. The value should be in the range [0, 6.28318]. | Yes |
| base_signal | enum<string> | Sine | Indicates the type of the waveform signal. This property is required for Vectorial Wave bands. Possible values are:<br>"Sine"<br>"Square"<br>"Triangle"<br>"SawToothUp"<br>"SawToothDown" | No |
| composition | array<MPEG_haptics.effect> | N/A | This attribute may only be used with Composite effects. It contains a list of effects. This type of effect does not directly contain keyframes. | No |
| keyframes | array<MPEG_haptics.keyframe> | N/A | List of MPEG_haptics.keyframes. This property may be used for Basis effects. If the keyframes array is empty, the effect does not contain haptic data. | No |

Table 2 illustrates an example description of MPEH_haptics.effect object that defines a kay frame position based in the scale, according to one or more embodiments.

TABLE 2

| Property | Type | Default | Description | Required |
|---|---|---|---|---|
| amplitude_modulation | Number | N/A | Amplitude of the keyframe. The value must be in the range [−1:1]. | No |
| frequency_modulation | Number | N/A | Relative frequency of the keyframe. The value must be in the range [0:10000] | No |
| relative_position | Integer | N/A | The relative position of the keyframe in scale. For example, the value position/scale indicates the relative temporal/spatial position in seconds/meters. The value is greater than or equal to 0. | No |

Figure 5:
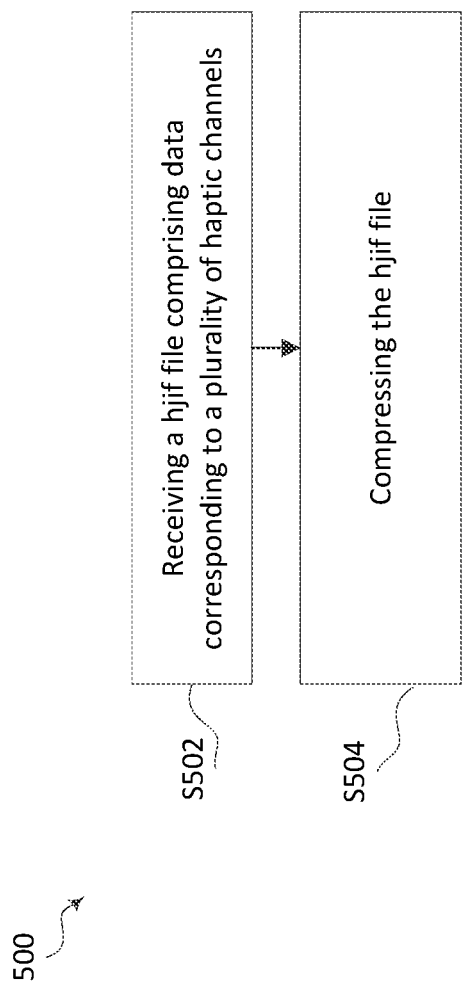
FIG. 5 is a flowchart of an example process performed by a haptic encoder, according to embodiments.

FIG. 5 illustrates a flowchart of an example process 500 performed by an encoder. The process 500 may be performed by the haptic encoder 300.

The process may start at operation S502 where a HJIF file comprising data corresponding to a plurality of haptic channels is received. In one or more examples, each haptic channel from the plurality of haptic channels is defined by a channel description that comprises a relative position parameter that specifies a relative position of a keyframe included in the data and a haptic position parameter of a haptic effect. For example, the relative position parameter may be the "relative_position" parameter in Table 2, and the haptic position parameter may be the "position" parameter in Table 1.

Both the relative position parameter and the haptic position parameter may be specified in accordance with a scale (e.g., ticks). If the relative position parameter and/or the haptic position parameter correspond to a temporal position, the scale may be a unit of time (e.g., seconds). If the relative position parameter and/or the haptic position parameter correspond to a spatial position, the scale may be a unit of distance (e.g., meters).

The process proceeds from operation S502 to operation S504 where the HJIF file is compressed. For example, the haptic encoder may compress the HJIF file into a .hmpg file.

Figure 6:
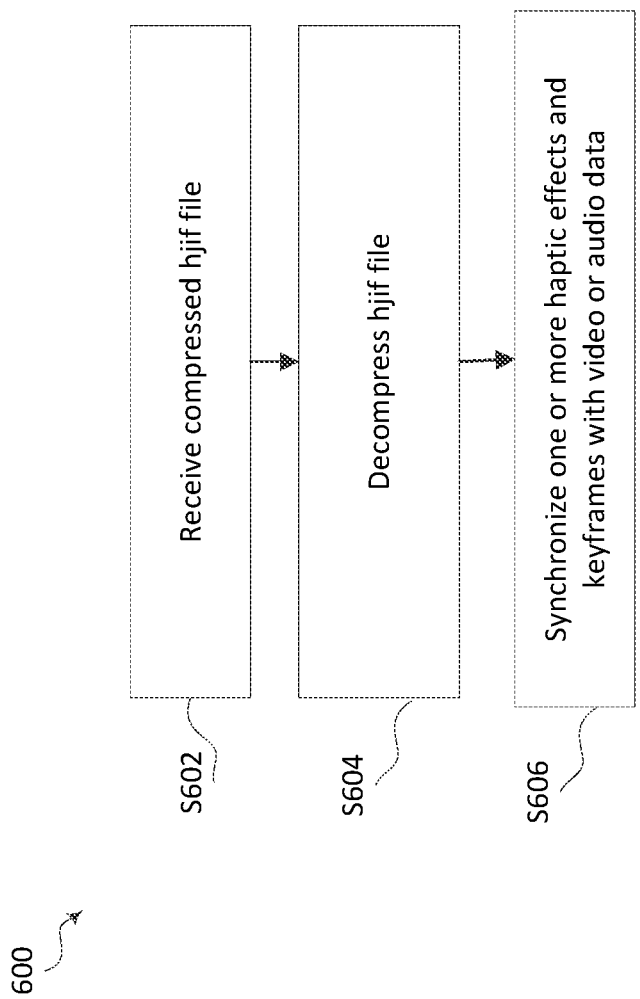
FIG. 6 is a flowchart of an example process performed by a haptic decoder, according to embodiments.

FIG. 6 illustrates a flow chart of an example process 600 performed by a decoder. The process 600 may be performed by the haptic decoder 350.

The process may start at operation S602 where a compressed HJIF file is received. For example, the received compressed HJIF file may be the compress .hmpg file generated by the haptic encoder 300.

The process proceeds to operation S604 where the HJIF file is decompressed. The process further proceeds to operation S606 where one or more haptic effects may be synchronized with video or audio data. For example, based on the relative_position parameter included in the HJIF file, a keyframe may be synchronized with video or audio data. Furthermore, based on the position parameter included in the HJIF file, a haptic effect may be synchronized with the video or audio data.

The proposed methods disclosed herein may be implemented by processing circuitry (e.g., one or more processors or one or more integrated circuits). In one example, the one or more processors execute a program that is stored in a non-transitory computer-readable medium to perform one or more of the proposed methods.

The techniques described above may be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The above disclosure also encompasses the embodiments listed below:

(1) A method of signaling a haptic java script object notation (JSON) interchange file format (HJIF) file, the method comprising: processing the HJIF file into a binary file format for distribution in a bitstream, in which the HJIF file comprises a plurality of haptic channels, in which each haptic channel from the plurality of haptic channels includes a channel description that comprises a relative position parameter that specifies a relative position of a keyframe included in the data and a haptic position parameter of a haptic effect, in which the relative position parameter and the haptic position parameter are specified in accordance with a scale, and in which the haptic effect and keyframe of each channel are synchronized with video or audio included in the bitstream based on the scale.

(2) The method according to feature (1), in which the scale comprises a plurality tick values representing a unit, each tick value corresponding to a different integer value.

(3) The method according to feature (2), in which the relative position parameter of the key frame is a tick value from the plurality of tick values according to the scale.

(4) The method according to feature (3), in which the unit corresponds to a unit of time, in which the relative position parameter of the key frame corresponds to a temporal position of the key frame, and in which the temporal position of the key frame in the unit of time is determined by dividing the tick value of the relative position parameter by the scale.

(5) The method of feature (3), in which the unit is a unit of distance, in which the relative position parameter of the key frame corresponds to a spatial position of the key frame, and in which the spatial position of the key frame is determined in the unit of distance by dividing the tick value of the relative position parameter by the scale.

(6) The method according to feature (2), in which the haptic position parameter of the haptic effect is a tick value from the plurality of values according to the scale.

(7) The method according to feature (6), in which the unit is a unit of time, in which the haptic position parameter of the haptic effect corresponds to a temporal position of the haptic effect, and in which the temporal position of the haptic effect in the unit of time is determined by dividing the tick value of the haptic position parameter by the scale.

(8) The method according to feature (6), in which the unit is a unit of distance, in which the haptic position parameter of the haptic effect corresponds to a spatial position of the haptic effect, and in which the spatial position of the haptic effect in the unit of distance is determined by dividing the integer value of the haptic position parameter by the scale.

(9) An apparatus for signaling a haptic java script object notation (JSON) interchange file format (HJIF) file, the apparatus comprising: at least one memory configured to store program code; and at least one processor configured to read the program code and operate as instructed by the program code, the program code including: processing code configured to cause the at least one processor to process the HJIF file into a binary file format for distribution in a bitstream, in which the HJIF file comprises a plurality of haptic channels, in which each haptic channel from the plurality of haptic channels includes a channel description that comprises a relative position parameter that specifies a relative position of a keyframe included in the data and a haptic position parameter of a haptic effect, in which the relative position parameter and the haptic position parameter are specified in accordance with a scale, and in which the haptic effect and keyframe of each channel are synchronized with video or audio included in the bitstream based on the scale.

(10) The method according to feature (9), in which the scale comprises a plurality tick values representing a unit, each tick value corresponding to a different integer value.

(11) The apparatus according to feature (10), in which the relative position parameter of the key frame is a tick value from the plurality of tick values according to the scale.

(12) The apparatus according to feature (11), in which the unit corresponds to a unit of time, in which the relative position parameter of the key frame corresponds to a temporal position of the key frame, and in which the temporal position of the key frame in the unit of time is determined by dividing the tick value of the relative position parameter by the scale.

(13) The apparatus of feature (11), in which the unit is a unit of distance, in which the relative position parameter of the key frame corresponds to a spatial position of the key frame, and in which the spatial position of the key frame is determined in the unit of distance by dividing the tick value of the relative position parameter by the scale.

(14) The apparatus according to feature (10), in which the haptic position parameter of the haptic effect is a tick value from the plurality of values according to the scale.

(15) The apparatus according to feature (14), in which the unit is a unit of time, in which the haptic position parameter of the haptic effect corresponds to a temporal position of the haptic effect, and in which the temporal position of the haptic effect in the unit of time is determined by dividing the tick value of the haptic position parameter by the scale.

(16) The apparatus according to feature (14), in which the unit is a unit of distance, in which the haptic position parameter of the haptic effect corresponds to a spatial position of the haptic effect, and in which the spatial position of the haptic effect in the unit of distance is determined by dividing the integer value of the haptic position parameter by the scale.

(17) A non-transitory computer readable medium having instructions stored therein, which when executed by a processor cause the processor to execute a method of signaling a haptic java script object notation (JSON) interchange file format (HJIF) file, the method comprising: processing the HJIF file into a binary file format for distribution in a bitstream, in which the HJIF file comprises a plurality of haptic channels, in which each haptic channel from the plurality of haptic channels includes a channel description that comprises a relative position parameter that specifies a relative position of a keyframe included in the data and a haptic position parameter of a haptic effect, in which the relative position parameter and the haptic position parameter are specified in accordance with a scale, and in which the haptic effect and keyframe of each channel are synchronized with video or audio included in the bitstream based on the scale.

(18) The non-transitory computer readable medium according to feature (17), in which the scale comprises a plurality tick values representing a unit, each tick value corresponding to a different integer value.

(19) The non-transitory computer readable medium according to feature (18), in which the relative position parameter of the key frame is a tick value from the plurality of tick values according to the scale.

(20) The non-transitory computer readable medium according to feature (19), in which the unit corresponds to a unit of time, in which the relative position parameter of the key frame corresponds to a temporal position of the key frame, and in which the temporal position of the key frame in the unit of time is determined by dividing the tick value of the relative position parameter by the scale.

What is claimed is:

1. A method of signaling a haptic java script object notation (JSON) interchange file format (HJIF) file, the method comprising:
    processing the HJIF file into a binary file format for distribution in a bitstream,
    wherein the HJIF file comprises a plurality of haptic channels,
    wherein each haptic channel from the plurality of haptic channels includes a channel description that comprises a relative position parameter that specifies a relative position of a keyframe included in the data and a haptic position parameter of a haptic effect,
    wherein the relative position parameter and the haptic position parameter are specified in accordance with a scale, and
    wherein the haptic effect and keyframe of each channel are synchronized with video or audio included in the bitstream based on the scale.

2. The method according to claim 1, wherein the scale comprises a plurality tick values representing a unit, each tick value corresponding to a different integer value.

3. The method according to claim 2, wherein the relative position parameter of the key frame is a tick value from the plurality of tick values according to the scale.

4. The method according to claim 3, wherein the unit corresponds to a unit of time, wherein the relative position parameter of the key frame corresponds to a temporal position of the key frame, and wherein the temporal position of the key frame in the unit of time is determined by dividing the tick value of the relative position parameter by the scale.

5. The method of claim 3, wherein the unit is a unit of distance, wherein the relative position parameter of the key frame corresponds to a spatial position of the key frame, and wherein the spatial position of the key frame is determined in the unit of distance by dividing the tick value of the relative position parameter by the scale.

6. The method according to claim 2, wherein the haptic position parameter of the haptic effect is a tick value from the plurality of values according to the scale.

7. The method according to claim 6, wherein the unit is a unit of time, wherein the haptic position parameter of the haptic effect corresponds to a temporal position of the haptic effect, and wherein the temporal position of the haptic effect in the unit of time is determined by dividing the tick value of the haptic position parameter by the scale.

8. The method according to claim 6, wherein the unit is a unit of distance, wherein the haptic position parameter of the haptic effect corresponds to a spatial position of the haptic effect, and wherein the spatial position of the haptic effect in the unit of distance is determined by dividing the integer value of the haptic position parameter by the scale.

9. An apparatus for signaling a haptic java script object notation (JSON) interchange file format (HJIF) file, the apparatus comprising:
    at least one memory configured to store program code; and
    at least one processor configured to read the program code and operate as instructed by the program code, the program code including:
    processing code configured to cause the at least one processor to process the HJIF file into a binary file format for distribution in a bitstream,
    wherein the HJIF file comprises a plurality of haptic channels,
    wherein each haptic channel from the plurality of haptic channels includes a channel description that comprises a relative position parameter that specifies a relative position of a keyframe included in the data and a haptic position parameter of a haptic effect,
    wherein the relative position parameter and the haptic position parameter are specified in accordance with a scale, and
    wherein the haptic effect and keyframe of each channel are synchronized with video or audio included in the bitstream based on the scale.

10. The method according to claim 9, wherein the scale comprises a plurality tick values representing a unit, each tick value corresponding to a different integer value.

11. The apparatus according to claim 10, wherein the relative position parameter of the key frame is a tick value from the plurality of tick values according to the scale.

12. The apparatus according to claim 11, wherein the unit corresponds to a unit of time, wherein the relative position parameter of the key frame corresponds to a temporal position of the key frame, and wherein the temporal position of the key frame in the unit of time is determined by dividing the tick value of the relative position parameter by the scale.

13. The apparatus of claim 11, wherein the unit is a unit of distance, wherein the relative position parameter of the key frame corresponds to a spatial position of the key frame, and wherein the spatial position of the key frame is determined in the unit of distance by dividing the tick value of the relative position parameter by the scale.

14. The apparatus according to claim 10, wherein the haptic position parameter of the haptic effect is a tick value from the plurality of values according to the scale.

15. The apparatus according to claim 14, wherein the unit is a unit of time, wherein the haptic position parameter of the haptic effect corresponds to a temporal position of the haptic effect, and wherein the temporal position of the haptic effect in the unit of time is determined by dividing the tick value of the haptic position parameter by the scale.

16. The apparatus according to claim 14, wherein the unit is a unit of distance, wherein the haptic position parameter of the haptic effect corresponds to a spatial position of the haptic effect, and wherein the spatial position of the haptic effect in the unit of distance is determined by dividing the integer value of the haptic position parameter by the scale.

17. A non-transitory computer readable medium having instructions stored therein, which when executed by a processor cause the processor to execute a method of signaling a haptic java script object notation (JSON) interchange file format (HJIF) file, the method comprising:

processing the HJIF file into a binary file format for distribution in a bitstream, wherein the HJIF file comprises a plurality of haptic channels, wherein each haptic channel from the plurality of haptic channels includes a channel description that comprises a relative position parameter that specifies a relative position of a keyframe included in the data and a haptic position parameter of a haptic effect, wherein the relative position parameter and the haptic position parameter are specified in accordance with a scale, and wherein the haptic effect and keyframe of each channel are synchronized with video or audio included in the bitstream based on the scale.

18. The non-transitory computer readable medium according to claim 17, wherein the scale comprises a plurality tick values representing a unit, each tick value corresponding to a different integer value.

19. The non-transitory computer readable medium according to claim 18, wherein the relative position parameter of the key frame is a tick value from the plurality of tick values according to the scale.

20. The non-transitory computer readable medium according to claim 19, wherein the unit corresponds to a unit of time, wherein the relative position parameter of the key frame corresponds to a temporal position of the key frame, and wherein the temporal position of the key frame in the unit of time is determined by dividing the tick value of the relative position parameter by the scale.

* * * * *